Patented May 28, 1935

2,003,277

UNITED STATES PATENT OFFICE 2,003,277

ACTIVATED CARBON

Edgar T. Olson, Marquette, Mich., assignor to The Cleveland Cliffs Iron Company, Cleveland, Ohio, a corporation of Ohio No Drawing. Application August 2, 1933, Serial No. 683,380

10 Claims. (Cl. 252—3)

This invention relates to activated carbon for use commercially in purifying, decolorizing and various filtering operations, and more particularly relates to highly activated wood charcoal for these and similar purposes.

Heretofore, activated carbons, commercially employed for filtering, purifying, and other like operations were for the most part made from finely divided carbon obtained from powdered coal, such as lignite or from the charred remnants of vegetable matter formed as a by-product in the production of wood pulp. These various forms of carbon have inherent properties which prevent their extensive use for high grade purposes. For example, in many cases they are too powdery or finely divided to be retained by the customary filters. Moreover, their production is slow and costly, for they are usually activated by a multi-step operation or by repeated activating steps. Prior to the present invention wood charcoal has not been commercially activated in such a manner that it could compete satisfactorily with other activated carbons on the market.

The activating methods used heretofore have employed chemicals such as zinc chloride, calcium acetate, sodium carbonate, phosphoric acid or other like chemicals in various treating operations. These methods do not adversely affect the finely divided carbon made from lignite or from pulp digesting liquors, but they are harmful to wood charcoal because they break down the cellular structure of the wood, which interferes with the activating thereof and destroys the advantages of the cellular structure.

The former activated carbons have contained a rather high percentage of ash, chlorides, iron, arsenic, glycerine solubles, and included volatiles. The apparent density of former activated carbons has been small and the electrical resistance high. Also the iodine and phenol absorption characteristics of such prior carbons have been low and the products have not proven satisfactory in many uses.

The activated wood charcoal of the present invention avoids the shortcomings of the prior known activated carbons and possesses many new properties, characteristics and advantages.

The new and improved activated wood charcoal of the present invention is highly activated. It is hard and porous and retains the original cellular structure of the wood from which it is made. It has a crystalline appearance and sparkles in bright light. It is free of arsenic while other chemically activated carbons contain at least four parts in one million and some contain much greater amounts. It has a very low iron content, usually under .025% as compared with iron contents of at least .1% and as high as 1.3% in other carbons. It has an extremely low electrical resistance, which, it is believed, indicates that it contains less included volatiles. In a standard test, it was found that at room temperatures 1 cubic inch of this charcoal offers a resistance of 41.8 ohms with electrodes pressing against the ends of the material with a pressure of 1 pound. This compares with an average resistance 200% greater and a low resistance of 100% greater, offered by other forms of activated carbon now obtainable.

The product comprising this invention has the extremely low ash content of approximately 3.7% to 5% in the unwashed state, and .1% to 1% in the washed state, as determined by the coal analysis test of the American Society for Testing Materials. This compares with an average ash content in other activated carbons which is approximately 300% greater.

It has an extremely high iodine absorption factor as compared with other wood charcoals. This factor is ordinarily determined by a procedure such as follows: Add 1 gram of the carbon to 50 ml. of 0.20 N iodine-potassium iodide solution; shake exactly 3 minutes; filter, discarding first runnings; and then determine iodine content of an aliquot portion with a standard sodium thiosulfate solution, using starch as an indicator. In running this test upon the charcoal of the present invention, an iodine absorption factor of 74.6% was obtained. This compares with an average absorption factor of about 50% in known activated carbons. This iodine absorption test is a very good indicator of the suitability of carbons for purifying and other industrial uses and it is employed more or less commonly as a means of checking the quality of the activated carbon.

The charcoal of the present invention has an extremely high phenol absorption value. In comparative tests, according to one method, given identical amounts of phenol in solution were subjected, respectively, to treatment with identical amounts of different types of carbon, and after identical agitating and filtering operations on each sample, the percent of phenol left in each solution was determined. The following results were obtained: Charcoal of the present invention, 15.9% phenol absorption; other activated carbons, approximately 10% phenol absorption. Expressed in terms of the standard Bayliss phenol test (American Water Works & Sewage Journal, September 1932) the charcoal of this invention has a phenol reduction rate of 30 to 15 parts per million, whereas other chemical carbons range 38 to 125 parts per million. This test briefly consists in determining the number of parts per million of carbon which must be added to reduce the phenol content of a given sample of water from .10 to .01 part per million.

The apparent density of the product of the present invention ranges from .45 to as high as .60. The average apparent density of other activated wood charcoals is approximately .42. The apparent densities of different carbons was determined by confining 100 cc. of the material in a chamber and tamping the confined material until there was no change in volume. The reduction in the volume was then taken as the apparent density which means that this figure represents the voids in the material. All the foregoing values of the present product were obtained from wood charcoal activated by the single-step process outlined hereinafter.

The present product is exceptionally valuable for substantially all commercial and industrial purifying, decolorizing, and filtering uses. Moreover, it can be readily reactivated after it has become saturated with substance with which it is used and so can be used over and over again.

In producing the activated wood charcoal of the present invention substantially any wood charcoal can be employed which is not too crumbly or soft to survive the treating operation. In general, any wood which retains its cellular structure during the entire operation can be employed. Such woods include for example: beech, birch, hard pine, maple and oak.

My copending application Serial No. 687,063, filed August 28, 1933, relates generally to a process for producing highly activated carbon and this process may be used to produce the activated charcoal of this application. The process briefly may comprise producing charcoal by substantially any known method from wood in which the grain structure is fairly well defined. The charcoal may be granulated, graded and cleaned of dust after which it is subjected to activating temperatures which drive all included volatiles from the charcoal. During the heating operation steam is passed thru the charcoal which assists in the proper activation thereof. Preferably the heating of the charcoal is accomplished by passing the charcoal continuously between electrodes of an electric furnace so that the charcoal is resistance heated to temperatures as high as 3300° F. After activation the charcoal may be ground to any degree of fineness wanted and can be used in any purifying, decolorizing, or other treating or filtering operation that may be desired.

The various factors, such as the size and rate of movement of the granules, the time of treatment, the size of the treating chamber, the amount of steam employed, the wattage of the electric current and the activating temperature, etc., are very carefully and definitely related and controlled in accordance with the teachings in my copending application, Serial No. 687,063, filed August 28, 1933, referred to above so that a new and improved form of activated charcoal is produced. By way of example these factors may be correlated as follows: In an electric furnace having an inner electrode about 4 inches in diameter and approximately 36" long, and an outer cylindrical electrode about 12" internal diameter and approximately 36" long which surrounds the inner electrode, the charcoal which has been granulated to pass thru about a four mesh screen, is fed continuously thru the furnace between the inner and outer electrodes at from ½ inch to 5 inches per hour. Thus an amount such as 500# of charcoal can be activated in 24 hours. Alternating electric current of approximately 30 amperes at about 500 volts is ordinarily employed. The amount of steam introduced into the charcoal during the heating operation may be in the neighborhood of 1# to 2# per hour.

In accordance with the patent statutes the invention has been specifically described; however, it will be understood that the scope of the invention is not limited thereby but is defined by the appended claims.

What is claimed is:

1. Activated hard wood charcoal, substantially free from dust, crystalline and sparkly in appearance, having the original cell structure of the wood, and having an electrical resistance of under 70 ohms to the cubic inch, an ash content in the unwashed state of under 7%, an iodine absorption factor of over 60%, a phenol absorption factor of under 30 parts per million (Bayliss), an apparent density of over .5, an iron content of under .1%, and said charcoal being substantially free of arsenic and glycerine solubles.

2. Activated carbon, capable of use in filtering liquids, substantially free from dust, crystalline and sparkly in appearance, in which the original cell structure of the material is preserved, said activated carbon having an electrical resistance of under 70 ohms to the cubic inch, an ash content in the unwashed state of under 7%, an iodine absorption factor of over 60%, a phenol absorption factor of under 30 parts per million (Bayliss), an apparent density of over .5, an iron content of under .1%, and said carbon being substantially free of arsenic and glycerine soluble.

3. Light porous activated wood charcoal, capable of use in filtering liquids, crystalline and sparkly in appearance, in which the original cell structure of the wood is preserved, said activated charcoal having an electrical resistance of under 70 ohms to the cubic inch, an ash content in the unwashed state of under 7%, an iodine absorption of over 60%, a phenol absorption of under 30 parts per million (Bayliss), an apparent density of over .5, and an iron content of under .1%.

4. Activated hard wood charcoal substantially dust free, crystalline and sparkly in appearance, in which the original cell structure of the wood is preserved, said activated charcoal having an electrical resistance of under 70 ohms to the cubic inch, an ash content in the unwashed state of under 7%, an iodine absorption of over 60%, a phenol absorption of under 30 parts per million (Bayliss), and an apparent density of over .5.

5. Activated hard wood charcoal, crystalline and sparkly in appearance, in which the original cell structure of the wood is preserved, said activated charcoal having an electrical resistance of under 70 ohms to the cubic inch, an iodine absorption of over 60%, a phenol absorption of under 30 parts per million (Bayliss), and an apparent density of over .5.

6. Activated hard wood charcoal having an electrical resistance of under 70 ohms to the cubic inch, an ash content in the unwashed state of under 7%, an iodine absorption of over 60%, a phenol absorption of under 30 parts per million (Bayliss), an apparent density of over .5, an iron content of under .1%, said charcoal being substantially free of arsenic and glycerine solubles.

7. Activated hard wood charcoal capable of use in filtering liquids which, after being treated to a single activation, is crystalline and sparkly and has the cellular body of the original wood preserved, said charcoal having an iodine absorption value of over 60%, a phenol absorption value of under 30 parts per million, an ash content in the unwashed state of under 7%, and an apparent density of over .5%.

8. Activated hardwood charcoal having the properties characteristic of those possessed by charcoal made from the same wood by passing such charcoal in granular, substantially dust-free form thru an electric furnace between inner and outer electrodes, and heating the charcoal to a temperature of between about 3000° F. and 3300° F. for about one hour by passing electric current thru it between said electrodes while subjecting the charcoal to the action of steam.

9. Activated hardwood charcoal having properties characteristic of those possessed by charcoal made from the same kind of wood by passing such charcoal in granular, substantially dust-free, form thru an electrical furnace between inner and outer electrodes at the rate of about 500 pounds per 24 hours, and resistance heating the charcoal to between about 3000° F and about 3300° F. for about one hour by passing thru the charcoal between said electrodes an electric current of about 500 volts at about 30 amperes while subjecting the charcoal to the action of steam at the rate of about 1 to 2 pounds per hour.

10. Light, porous, cellular, substantially dust-free, granular activated hardwood charcoal having an iodine absorption value of over about 60%.

EDGAR T. OLSON.